(12) United States Patent
Dietrich

(10) Patent No.: US 7,154,679 B2
(45) Date of Patent: Dec. 26, 2006

(54) OPTICAL ARRANGEMENT WITH A TELECENTRIC BEAM REGION

(75) Inventor: Peter Dietrich, Oberkochen (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/522,864

(22) PCT Filed: Jul. 8, 2003

(86) PCT No.: PCT/EP03/07316

§ 371 (c)(1),
(2), (4) Date: Sep. 2, 2005

(87) PCT Pub. No.: WO2004/019109

PCT Pub. Date: Mar. 4, 2004

(65) Prior Publication Data

US 2006/0109563 A1 May 25, 2006

(51) Int. Cl.
*G02B 13/22* (2006.01)
*G02B 21/00* (2006.01)

(52) U.S. Cl. ...................... 359/663; 359/368

(58) Field of Classification Search ........... 359/663, 359/676, 679, 363, 368, 379–382, 821; 348/79–80, 348/86, 92, 125, 126, 363

See application file for complete search history.

(56) References Cited

U.S. PATENT DOCUMENTS 4,935,612 A * 6/1990 Bierleutgeb .............. 250/201.2
5,896,224 A * 4/1999 Kapitza ...................... 359/389
6,292,306 B1    9/2001 Betensky .................... 359/663
6,597,499 B1 * 7/2003 Kawano et al. ............ 359/387

FOREIGN PATENT DOCUMENTS

| DE | 33 18 011 | 11/1984 |
| DE | 39 18 990 | 12/1990 |
| DE | 42 31 470 | 3/1994 |
| DE | 195 04 427 | 9/1995 |
| DE | 101 01 184 | 8/2001 |
| EP | 1 220 005 | 7/2002 |
| WO | WO 02/23247 | 3/2002 |

* cited by examiner

Primary Examiner—Scott J. Sugarman
Assistant Examiner—M. Hasan
(74) Attorney, Agent, or Firm—Reed Smith LLP

(57) ABSTRACT

An optical arrangement with telecentric beam region for imaging objects, preferably a microscope, comprises in a main beam path at least one infinity-imaging objective and at least one eyepiece with an eyepiece intermediate image plane and a tube lens of suitable focal length which is arranged between the latter at a fixed distance from the objective. At least one optical element in the form of a beam splitter module or beam splitters for laterally splitting off at least a first partial beam path is provided in the space between the objective and the tube lens in which the telecentric beam path is located. A tube lens is located at a suitable distance from the objective in each of these first partial beam paths. At least a second partial beam path is branched off from at least one of these first partial beam paths and a tube lens is located at a suitable distance from the objective in each of these second partial beam paths. The tube lenses arranged in the individual partial beam paths have the same focal length or different focal lengths.

9 Claims, 2 Drawing Sheets

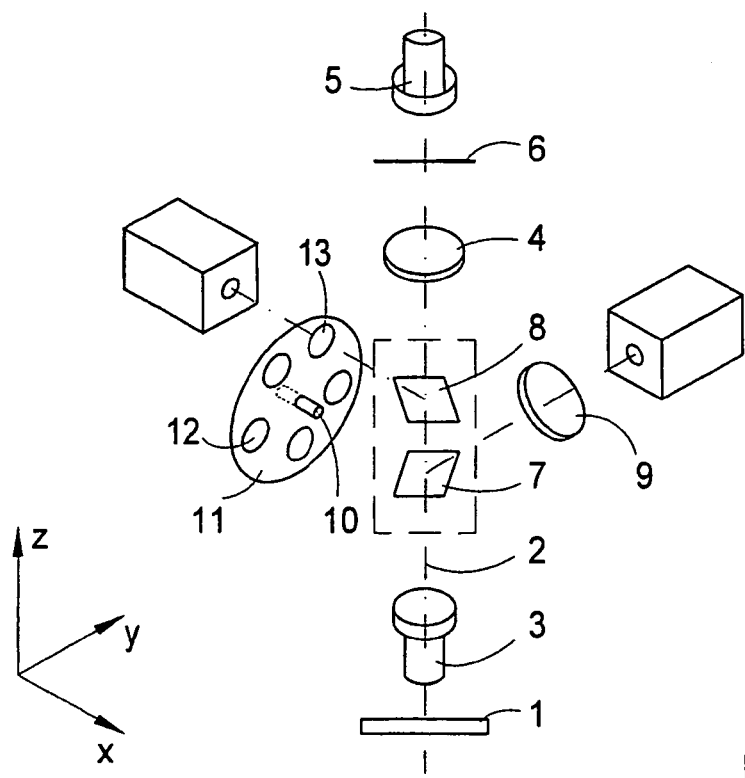
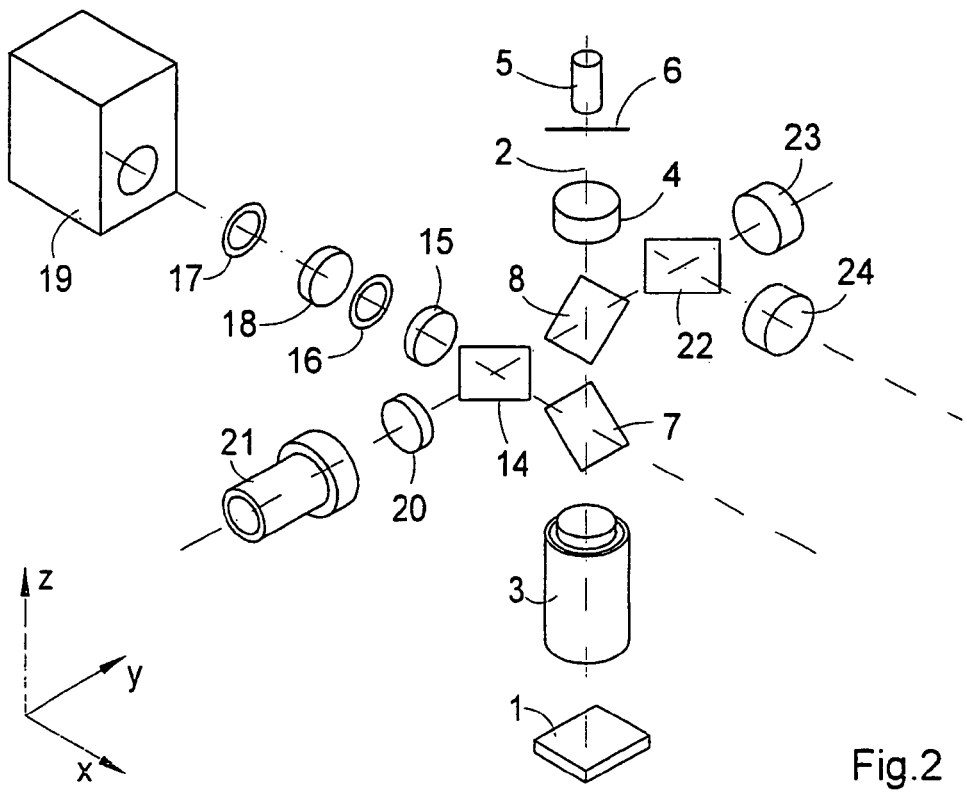
Fig.1
Fig.2

OPTICAL ARRANGEMENT WITH A TELECENTRIC BEAM REGION

CROSS-REFERENCE TO RELATED APPLICATIONS

This application claims priority of International Application No. PCT/EP2003/007316, filed Jul. 8, 2003, and German Application No. 102 35 388.3, filed Aug. 2, 2002, the complete disclosures of which are hereby incorporated by reference.

FIELD OF THE INVENTION

The invention is directed to an optical arrangement with a telecentric beam region with an infinity-imaging objective, in particular a microscope.

DESCRIPTION OF THE RELATED ART

Optical arrangements, particularly microscopes, with a beam path encompassing a telecentric beam region have so-called infinity optics which comprise infinity-imaging objectives and a tube lens that is arranged at a fixed distance from the objective. This telecentric beam region is located between the objective and the tube lens. Instead of one tube lens, a plurality of tube lenses of different focal lengths are also occasionally accommodated in a revolving turret for purposes of changing magnification. To generate a corrected intermediate image at the distance of the intersection length of the tube lenses, an aberration correction can be carried out exclusively by means of the objective. However, this correction can also be divided between the objective and tube lens. In both cases, it is necessary to arrange the individual optical components at a defined distance from one another and to maintain this distance in order to prevent aberrations and vignetting.

The telecentric beam region situated between the objective and tube lens is conventionally used in microscopes in the direction of the microscope axis to introduce optical plane elements, e.g., prisms, splitter mirrors, plane plates, filters, polarizing elements, into the imaging beam path of the device without negatively influencing the intermediate image. Optics which generate an image offset to compensate for larger optical paths are not required.

The optical plane elements are usually located in the imaging beam path in which they are positioned one above the other in different planes perpendicular to the microscope axis, either in a fixed manner or so that they can be switched into the beam path. Since the telecentric beam region defined by the distance between the objective and tube lens may not exceed a determined upper limit for known optical reasons, the maximum quantity of components that can be introduced is limited. Further, the telecentric beam region is also limited toward the side and toward the back by structural factors of the device, particularly by the device body.

DE 42 31 470 A1 discloses a modular microscope system which has a multipart microscope base body having a stand base, an upper stand part and an intermediate module with an attachable binocular housing. The base body is a multipart frame construction on which locating surfaces are provided for positioning supports on which are arranged optical and/or mechanical and/or electric or electronic subassemblies that are combined to form functional units. Optical components such as mirrors, lenses, diaphragms or a revolving turret unit can be mounted on these supports. Further, an intermediate module can be provided which has a tube lens and which can be exchanged for another intermediate module which has, for example, a switchable and preadjusted Bertrand lens in addition to a tube lens.

The above-cited reference discloses an adjustable body of a microscope system comprising optical-mechanical modules which are closed, per se, but which do not allow any branch-type expansion of the telecentric beam region, except for the branching of the illumination beam path which is always provided.

OBJECT AND SUMMARY OF THE INVENTION

Therefore, it is the primary object of the invention to provide an optical arrangement with a telecentric beam region that is expanded in a plurality of coordinate directions.

According to the invention, this object is met by an optical arrangement with telecentric beam region for imaging object comprising at least one infinity-imaging objective, at least one eyepiece and a tube lens of suitable focal length which is arranged between the two at a fixed distance from the objective. At least one optical element is provided for laterally splitting of at least a first partial beam path in the space between the objective and the tube lens in which a telecentric beam path is located. A tube lens is located at a suitable distance from the objective in each of said first partial beam paths.

At least one optical element for laterally branching off at least a first partial beam path is provided in the space between the objective and the tube lens, that is, in the telecentric beam region in which the telecentric beam path is located, wherein a tube lens is located at a suitable distance from the objective in each of these first partial beam paths.

In order to expand the telecentric beam region to two coordinates also, it is advantageous when at least a second partial beam path branches off from at least one of these first partial beam paths and when a tube lens is located at a suitable distance from the objective in each of these second partial beam paths.

A three-dimensional expansion of the telecentric beam region can advantageously be realized when at least a third partial beam path is branched off from at least one of these second partial beam paths and when a tube lens is located at a suitable distance from the objective in each of these third partial beam paths.

It is advantageous that the tube lenses arranged in the first, second and third partial beam paths have the same focal length or different focal lengths. Accordingly, depending upon the requirements for coupling in and coupling out beam paths, the focal length of the provided tube lenses can also be varied. When the focal lengths of all of the tube lenses that are used are the same, there is an identical imaging scale for all of the intermediate images that are provided.

A further advantage consists in that optical and/or physical beam splitter elements, known per se, are provided for branching the first, second and third partial beam paths, wherein these beam splitter elements are arranged in the space between the objective and the respective tube lens of the partial beam path to be branched.

For operation and for purposes of multivalent applications of the device, it is advantageous to provide interchangeable devices or modules which carry beam splitter elements and which are coupled with controllable drive units for the purpose of insertion into the respective partial beam path. This ensures that the beam splitter elements can be exchanged faster and in a more mechanized and controllable manner and that they can be moved quickly into the respective beam path. Accordingly, it is also advantageous when the beam splitter elements are arranged in the interchangeable devices in an exchangeable manner.

For purposes of a versatile use of the device according to the invention, it is advantageous when diaphragms and/or optical filters, particularly interference filters, color filters or polarizing filters, which serve to influence the optical characteristics of the light of the respective partial beam path are arranged in the first, second and/or third partial beam paths.

An expansion of the telecentric beam region of optical arrangements, particularly microscopes, can be realized by the invention in a simple manner in a plurality of coordinate directions while retaining a good optical correction of the imaging system. The telecentric beam region which is expanded in this way can accordingly be used for many purposes by coupling in or coupling out intermediate images or other beam paths. In this way, it is possible to expand the telecentric beam region in case of additional application requirements. Another advantage of the arrangement consists in that the ergonomic eyepiece height or viewing height of the microscope tube is maintained because the length of the telecentric beam region in the direction of the optical axis of the main beam path of the microscope is not changed by the expansion of the telecentric beam region according to the invention.

The invention will be explained more fully in the following with reference to an embodiment example.

BRIEF DESCRIPTION OF THE DRAWINGS

In the accompanying drawings:

FIG. 1 shows a highly simplified view of an optical arrangement with two partial beam paths that are branched off in the telecentric beam region;

FIG. 2 shows a perspective view of an arrangement with branched partial beam paths.

DESCRIPTION OF THE PREFERRED EMBODIMENTS

Figure 3:
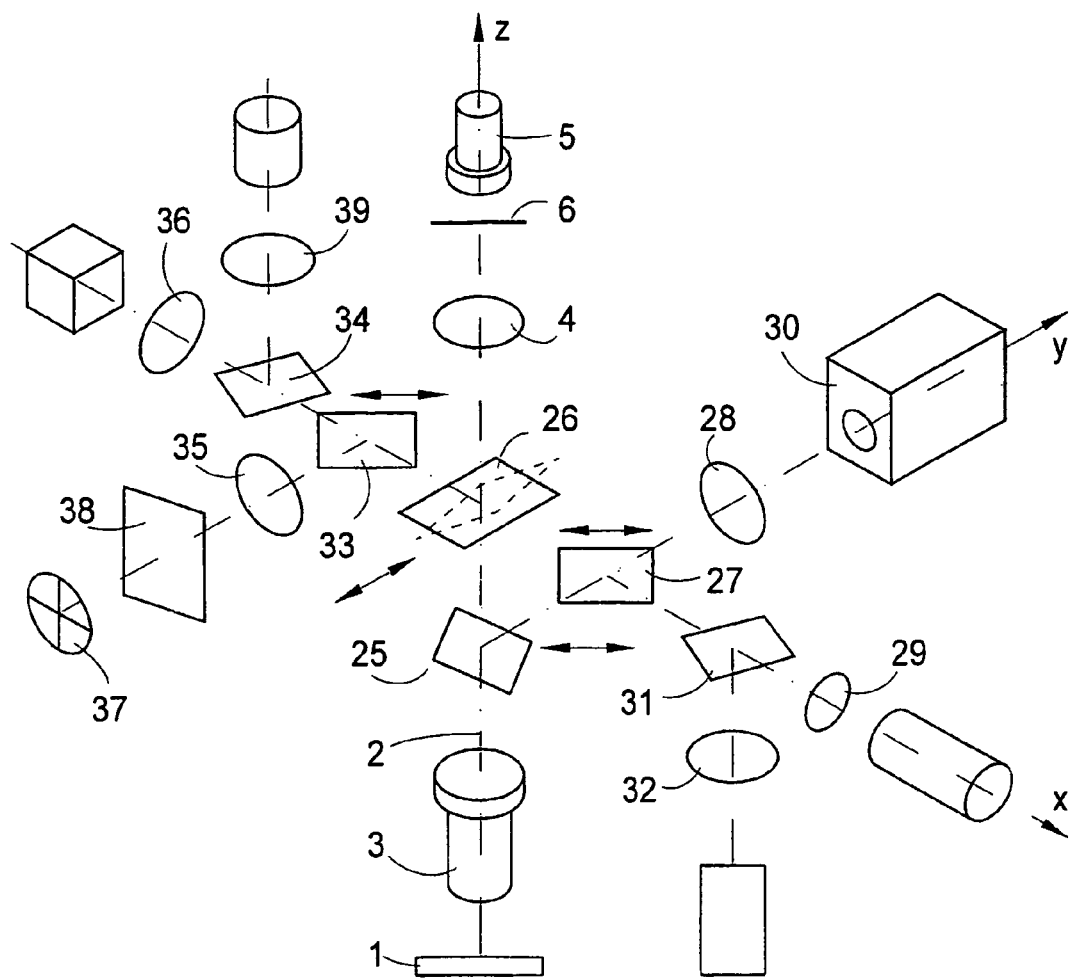
FIG. 3 shows a highly simplified view of an arrangement with partial beam paths that are branched off in three dimensions.

FIG. 1 shows a highly simplified view of an optical arrangement according to the invention, for example, a microscope beam path, which is used for magnified imaging of an object 1. The optical arrangement comprises, along an optical axis 2, an infinity-imaging objective 3, a tube lens 4 and an eyepiece 5 with an eyepiece intermediate image plane 6 in which the object 1 is imaged by the objective 3 and the tube lens 4. The image of the objective 3 generated in the eyepiece intermediate image plane 6 can be observed through the eyepiece 5 in a magnified manner. The objective 3, tube lens 4 and eyepiece 5 form the typical microscope beam path which forms the main beam path in the optical arrangement. In the beam path of the arrangement, the infinity-imaging objective 3 generates a parallel beam path and the image generation in the eyepiece intermediate image plane 6 is carried out through the tube lens 4 which has a suitable focal length. The telecentric beam region of the main beam path is located between the objective 3 and the tube lens 4, i.e., the course of the beam is parallel in this region. This telecentric beam region, or telecentric space, is usually used in the direction of the optical axis 2 to arrange optical plane elements such as prisms, splitter mirrors, and plane-parallel plates as filters and/or polarizing elements in the beam path without negatively influencing the intermediate image in the eyepiece intermediate image plane 6.

As can also be seen from FIG. 1, optical elements are provided in the telecentric beam region as beam splitters 7 and 8 for laterally splitting off (in the X-Y plane) two first partial beam paths in which tube lenses are arranged. Accordingly, a tube lens 9 is located in the partial beam path that is branched off by the beam splitter 7. For example, a revolving turret 11 which is rotatable on a shaft 10 and has a plurality of tube lenses 12; 13 of different focal lengths is arranged in the partial beam path that is branched off by beam splitter 8. Depending upon the purpose for which they are used, these different tube lenses 9; 12; 13 can be moved into the corresponding partial beam paths that are branched off from the main beam path. A camera can also be arranged downstream of a tube lens of this kind, for example.

The beam splitters 7 and 8 can be combined to form a beam splitter module (shown in dashed lines in FIG. 1) which is arranged, e.g., as a unit, in the corresponding beam path. Depending upon the purpose of the application, the beam splitter module can be provided with different deflecting elements such as color splitters, neutral splitters or full reflectors. In addition, optical plane elements such as filters of various types can be arranged in the beam splitter module. It is also possible for the beam splitter module to be moved in and out of the corresponding main beam path or partial beam path in a switchable manner. These switchable beam splitter modules can also be provided with controllable drive units (not shown).

The tube lenses 4; 9; 12; 13 define the respective telecentric beam region of the main beam path and partial beam path in which they are arranged and thus form an optical interface. These tube lenses 4; 9; 12; 13 can also be arranged in a mechanical adapter (not shown) which has corresponding connection surfaces and can accordingly form suitable mechanical interfaces. These adapters can accordingly be arranged at suitable positions in the individual beam paths. In this way it is also possible to use one and the same tube lens and the associated mechanical adapter, including its interface, for a variety of purposes.

The arrangement, shown in a perspective view in FIG. 2, for magnified imaging of small objects 1, for example, a microscope, likewise has a main beam path in which the objective 3, the beam splitter 7; 8, the tube lens 4 and the eyepiece 5 with the eyepiece intermediate image plane 6 are arranged along the optical axis 2. Since these optical components in the main beam path have the same functions as the components used in the arrangement according to FIG. 1, the same reference numbers are used. The same applies to the arrangement according to FIG. 3 which will be described in the following.

In the optical arrangement according to FIG. 2, another beam splitter 14 is arranged in the first partial beam path which is branched off by the beam splitter 7. Downstream of this beam splitter 14 are arranged, in order, in another partial beam path another tube lens 15 with a suitable focal length, and other optical elements, e.g., diaphragms 16; 17, filter 18 and possibly a light source 19 or a display screen. Another illumination beam path, for example, can be reflected into the main beam path by the light source 19.

A tube lens 20 and another eyepiece 21 for observing the object 1, e.g., by a second person, are provided in another, second partial beam path which is branched off from the first partial beam path by beam splitter 14.

Another first partial beam path is branched off from the main beam path by the beam splitter 8 that is situated in the main beam path and is branched further by another beam splitter 22. Suitable tube lenses 23; 24 are again arranged in each of these branched off second partial beam paths; other optical imaging devices, beam-guiding devices and/or viewing devices, not shown, can be arranged downstream of the tube lenses 23; 24. These tube lenses 15; 20; 23; 24, like tube lens 4 in the main beam path, define the telecentric beam region of the partial beam path in which they are arranged. By means of this kind of arrangement of the optical elements, an expansion of the telecentric space the X-Y plane can be realized in a simple manner, while maintaining the viewing height of the eyepiece 5 of the main beam path, for example.

In the description and in the claims, a partial beam path which is branched off directly from the main beam path is referred to as a "first" partial beam path, and a partial beam path which is branched off from a "first" partial beam path is referred to as a "second partial beam path. A partial beam path which is branched off from a "second" partial beam path is referred to more exactly as a "third" partial beam path.

FIG. 3 shows an optical arrangement in which a telecentric beam region which is expanded in the X-Y plane is also expanded in z-direction for additional coupling in and coupling out of beam paths, for illumination, or for microtools. The objective 3, the tube lens 4 and the eyepiece 5 with the eyepiece intermediate image plane 6 are also arranged along the optical axis 2 in this arrangement, e.g., a microscope, for magnified imaging or observation of the object 1. As in the arrangements according to FIGS. 1 and 2, these optical components form the main beam path. Beam splitter modules 25 and 26 are provided in the main beam path as beam splitters, shown in a simplified manner as reflectors, for generating first partial beam paths which can be switched in and out of this beam path as is represented by the double arrows in FIG. 3.

It will be seen in FIG. 3 that the beam splitter module 25 forms a first partial beam path with another beam splitter module 27 by which second partial beam paths are branched off in the X-Y plane by tube lenses 28 and 29 in the X-Y plane. A light source 30, for example, for additional illumination of the object 1 is arranged in one of these second partial beam paths. The other second partial beam path is split by another beam splitter 31 into a third partial beam path with a tube lens 29 and into another third partial beam path with a tube lens 32. The latter partial beam path extends in an optical axis parallel to the z-axis resulting in a three-dimensional expansion of the telecentric beam region of the arrangement.

The other first partial beam path generated by the beam splitter module 26 is similar in construction to the first partial beam path generated by the beam splitter module 25. This beam splitter module 26 can also be arranged so as to be swivelable, which is indicated in FIG. 3 by dashes. A beam splitter module 33 that is arranged downstream of the beam splitter module 26 further branches the first partial beam path that is generated by beam splitter module 26. Another beam splitter 34 follows directly in one branched second partial beam path and generates third partial beam paths in which suitable tube lenses 35 and 36 are arranged; additional optical components can follow the latter. For example, a comparison plate 38 such as is used in metallography for comparing polished section samples, etc. and which is illuminated by an illumination device can be made to coincide with an image of the object 1 in an intermediate image plane, so that the object 1 can be compared, for example, with a model or standard.

Another third partial beam path which is branched off by the beam splitter 34 and in which a tube lens 39 is arranged extends in a direction parallel to the z-axis, so that a spatial expansion of the telecentric beam region is also provided in this case.

In the optical arrangement according to the invention shown in FIG. 3, the individual beam splitter modules and beam splitters can also be arranged in such a way that they can be switched in and out (double arrow in FIG. 3) of the respective partial beam path in a useful manner so that additional imaging beam paths, observation beam paths and illumination beam paths can be realized simultaneously and alternately.

The optical arrangement according to the invention permits the telecentric beam region, spatially defined per se, of a microscope beam path to be expanded in the plane as well as three-dimensionally. In this way, a quantity of additional beam paths can be mixed in and removed from the microscope beam path and the range of application of the microscope can be expanded.

While the foregoing description and drawings represent the present invention, it will be obvious to those skilled in the art that various changes may be made therein without departing from the true spirit and scope of the present invention.

REFERENCE NUMBERS 1 object
2 optical axis
3 objective
4 tube lens
5 eyepiece
6 eyepiece intermediate image plane
7; 8 beam splitter
9 tube lens
10 shaft
11 revolving turret
12; 13 tube lens
14 beam splitter
15 tubelens
16; 17 diaphragms
18 filter
19 light source
20 tube lens
21 eyepiece
22 beam splitter
23; 24 tube lens
25; 26 beam splitter module
27 beam splitter module
28; 29 tube lens
30 light source
31 beam splitter
32 tube lens
33 beam splitter module
34 beam splitter
35; 36 tube lens
37 illumination device
38 comparison plate
39 tube lens

The invention claimed is:

1. An optical arrangement with telecentric beam region for imaging objects, comprising:
at least one infinity-imaging objective;
at least one eyepiece; and
a tube lens of suitable focal length which is arranged between the two at a fixed distance from the objective, at least one optical element for laterally splitting off at least a first partial beam path being provided in the space between the objective and the tube lens in which a telecentric beam path is located; and a tube lens being located at a suitable distance from the objective in each of said first partial beam paths wherein the tube lenses arranged in the first, second and third partial beam paths have the same focal length or different focal lengths.

2. The arrangement according to claim 1, wherein at least a second partial beam path is branched off from at least one of these first partial beam paths, and wherein a tube lens is located at a suitable distance from the objective in each of these second partial beam paths.

3. The arrangement according to claim 2, wherein at least a third partial beam path is branched off from at least one of these second partial beam paths, and wherein a tube lens is located at a suitable distance from the objective in each of these third partial beam paths.

4. The arrangement according to claim 1, wherein optical and/or physical beam splitter elements, are provided for branching the first, second and third partial beam paths, wherein these beam splitter elements are arranged in the space between the objective and the respective tube lens of the partial beam path to be branched.

5. The arrangement according to claim 1, wherein interchangeable devices or modules are provided which carry beam splitter elements and which are coupled with controllable drive units for the purpose of insertion into the respective partial beam path.

6. The arrangement according to claim 5, wherein the beam splitter elements are arranged in the interchangeable devices in an exchangeable manner.

7. The arrangement according to claim 1, wherein diaphragms and/or optical filters, particularly interference filters, color filters or polarizing filters, which serve to influence the optical characteristics of the light of the respective partial beam path are arranged in the first partial beam paths, second partial beam paths and/or third partial beam paths.

8. The arrangement according to claim 7, wherein the optical filters are interference filters, color filters or polarizing filters.

9. An optical arrangement with telecentric beam region for imaging objects, comprising:

at least one infinity-imaging objective;

at least one eyepiece; and a tube lens of suitable focal length which is arranged between the two at a fixed distance from the objective, at least one optical element for laterally splitting off at least a first partial beam path being provided in the space between the objective and the tube lens in which a telecentric beam path is located; and a tube lens being located at a suitable distance from the objective in each of said first partial beam paths wherein the tube lenses arranged in the first, second and third partial beam paths have the same focal length or different focal lengths and interchangeable devices or modules are provided which carry beam splitter elements and which are coupled with controllable drive units for the purpose of insertion into the respective partial beam path.

* * * * *